United States Patent
Gwak

(10) Patent No.: US 8,150,176 B2
(45) Date of Patent: Apr. 3, 2012

(54) METHOD AND APPARATUS FOR CONTROLLING A COMPRESSION RATE FOR A FILE

(75) Inventor: Jin-pyo Gwak, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

(21) Appl. No.: 12/283,049

(22) Filed: Sep. 9, 2008

(65) Prior Publication Data

US 2009/0136144 A1 May 28, 2009

(30) Foreign Application Priority Data

Nov. 28, 2007 (KR) .................. 10-2007-0121994

(51) Int. Cl.
*G06K 9/36* (2006.01)
*G06K 9/46* (2006.01)
(52) U.S. Cl. ..................................................... 382/232
(58) Field of Classification Search .......... 382/218–220, 382/232, 233, 251; 375/240.03, 240.07, 375/240.13; 348/222.1, 231.2, 231.99, 404.1; 707/1; 709/203; 715/243, 254, 749
See application file for complete search history.

(56) References Cited

U.S. PATENT DOCUMENTS

| | | | |
|---|---|---|---|
| 6,614,942 B1 | 9/2003 | Meier | |
| 7,254,271 B2 * | 8/2007 | Aguera y Arcas | 382/232 |
| 7,454,698 B2 * | 11/2008 | Kohda et al. | 715/254 |
| 7,542,078 B2 * | 6/2009 | Okusa | 348/231.2 |
| 2009/0136144 A1 * | 5/2009 | Gwak | 382/232 |
| 2010/0050089 A1 * | 2/2010 | Kim et al. | 715/749 |

* cited by examiner

*Primary Examiner* — Amir Alavi
(74) *Attorney, Agent, or Firm* — Drinker Biddle & Reath LLP

(57) ABSTRACT

Provided are a method and apparatus for determining a target compression rate for a file, which may be calculated using a predetermined algorithm based on a target file size. There is provided a method for compressing a file, the method including using a processor to perform at least the steps of compressing a target file at an initial compression rate and determining a size of the compressed target file; comparing the size of the target file compressed at the initial compression rate to sizes of a first file and a second file compressed at the initial compression rate; based on the comparisons and a target size for the target file, calculating a target compression rate; and compressing the target file using the target compression rate.

20 Claims, 5 Drawing Sheets

METHOD AND APPARATUS FOR CONTROLLING A COMPRESSION RATE FOR A FILE

CROSS-REFERENCE TO RELATED PATENT APPLICATION

This application claims the benefit of Korean Patent Application No. 10-2007-0121994, filed on Nov. 28, 2007, in the Korean Intellectual Property Office, the disclosure of which is incorporated herein in its entirety by reference.

BACKGROUND OF THE INVENTION

1. Field of the Invention

The present invention relates to a method of encoding and compressing a file, and more particularly, to a method and apparatus for controlling a compression rate of a file.

2. Description of the Related Art

In general, when an image file is generated using a digital photographing device, an encoding process is performed in order to convert an analog image to a digital image. The encoding process is a process for recognizing an image file and converting the image file into a reproducible file format in a digital device such as a computer, a mobile phone, or a personal digital assistant (PDA). Also, when a user wants to transmit an image file from a first digital device to a second digital device, the encoding process includes a series of processes for editing and converting the image file into another format by using the first digital device in order to reproduce the edited and converted image file in the second digital device.

Such an encoding process often includes compressing the image file. A conventional compression method is performed by roughly predicting a compression rate in accordance with empirical rules, compressing an image by applying the predicted compression rate to the image, checking that a file size of the compressed image is within a target file size range and, if the file size is not in the target file size range, repeating the predicting and the compressing until the file size is in the target file size range. However, a correlation between the compression rate and the file size is not linear and may differ in accordance with a file type. Thus, it may be difficult to accurately and easily predict the compression rate.

SUMMARY OF THE INVENTION

The present invention provides a method and apparatus for determining a compression rate for a file, which is based, in part, on a target size for the file.

According to one embodiment of the present invention, there is provided a method of determining a compression rate of a file, the method including creating a first correlation between a compression rate and a file size of a first file; creating a second correlation between the compression rate and the file size of a second file; compressing a third file to a file size Ti by applying a predetermined compression rate a to the third file; calculating a file size Tmax1 by applying the predetermined compression rate a to the first correlation; calculating a file size Tmin1 by applying the predetermined compression rate a to the second correlation; calculating a target compression rate b by using a difference x between the file size Ti and the file size Tmax1, a difference y between the file size Ti and the file size Tmin1, and a target file size Tf of the third file.

The third file may be compressed to the target file size Tf by applying the target compression rate b to the third file.

In an embodiment of the present invention, a compression rate is a rate of reducing the size of a file. For example, if a file having a file size 1 to a file size 1/8, the compression rate may be 1/8.

The calculating of the target compression rate b may include calculating a file size Tmax2 that is a file size of the first file when the target compression rate b is applied to the first correlation, using Equation 1 below; calculating a file size Tmin2 that is a file size of the second file when the target compression rate b is applied to the second correlation, using Equation 2 below; and calculating the target compression rate b corresponding to the file size Tmax2 and the file size Tmin2.

$$x = \frac{|Tmax2 - Tf|}{Tmax2 - Tmin2} \quad (1)$$

$$y = \frac{|Tmin2 - Tf|}{Tmax2 - Tmin2} \quad (2)$$

The first correlation may have a larger file size than the second correlation at the same compression rate. That is, if the first and second files are compressed by applying the same compression rate to the first and second files, a file size of the first file is larger than the file size of the second file.

In another embodiment, the first correlation may have a larger variation in file size than the second correlation at the same variation in compression rate. That is, if the first and second files are compressed by applying the same compression rate to the first and second files, a file size of the first file is reduced more than the file size of the second file is reduced.

In an embodiment, the first, second, and third files may be audio files, text files, or image files.

In an embodiment, if the first, second, and third files are image files such as still images or video images, an image is composed of a plurality of pixels and image data includes gradation values of the pixels. In this case, the first file may have a larger sum of gradation differences between neighboring pixels than the second file. That is, the first file may include a relatively complicated image and the second file may include a relatively simple image.

The first and second correlations may be represented as graphs or tables.

The method may further include determining whether the file size Ti is within a target file size Tf range. Here, the target file size Tf range is an acceptable range of the target file size Tf. That is, the target file size Tf range is a range in which an acceptable limit error that can be regarded to be the same as the target file size Tf is added to and subtracted from the target file size Tf.

If the file size Ti is not within target file size Tf range, the target compression rate b may be obtained by calculating the file sizes Tmax1 and Tmin1, and the differences x and y in order to reset the compression rate.

According to another embodiment of the present invention, there is provided an apparatus for controlling a compression rate of a file, the apparatus including a storage unit for storing a first correlation between a compression rate and a file size of a first file, and a second correlation between the compression rate and the file size of a second file; an input unit for inputting a third file; a compression unit for compressing the third file; a first calculation unit for calculating differences x and y from a file size of the third file compressed by the compressing unit to file sizes calculated by applying a compression rate of the third file to the first and second correlations, respectively; and a second calculation unit for calculating a target compression rate by using the differences x and y and a target file size.

The apparatus may further include a determination unit for determining whether the file size of the third file compressed by the compression unit is within a target file size range.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
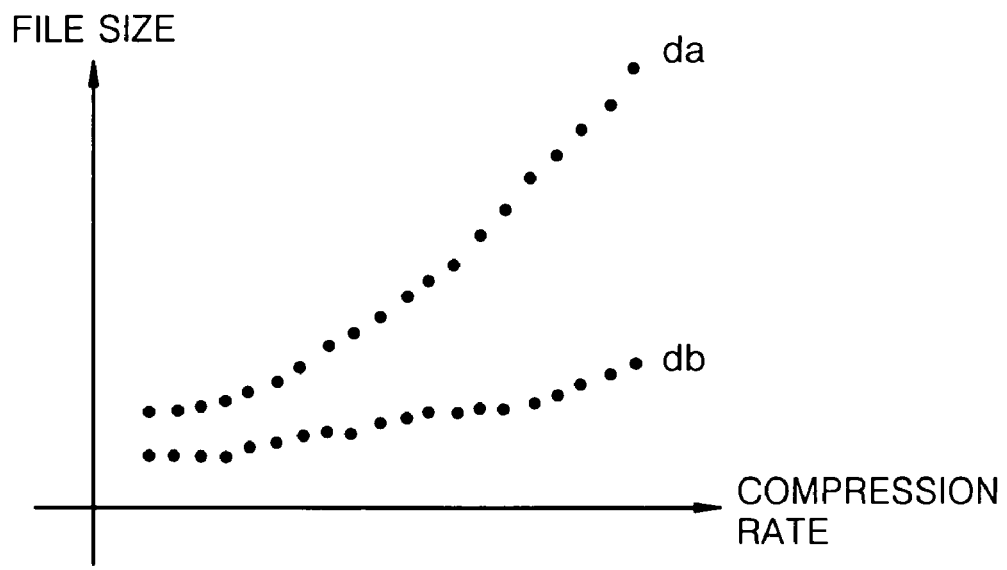
FIGS. 1 and 2 are graphs for describing a step of creating first and second correlations in a method of controlling a compression rate of a file, according to an embodiment of the present invention.
Figure 2:
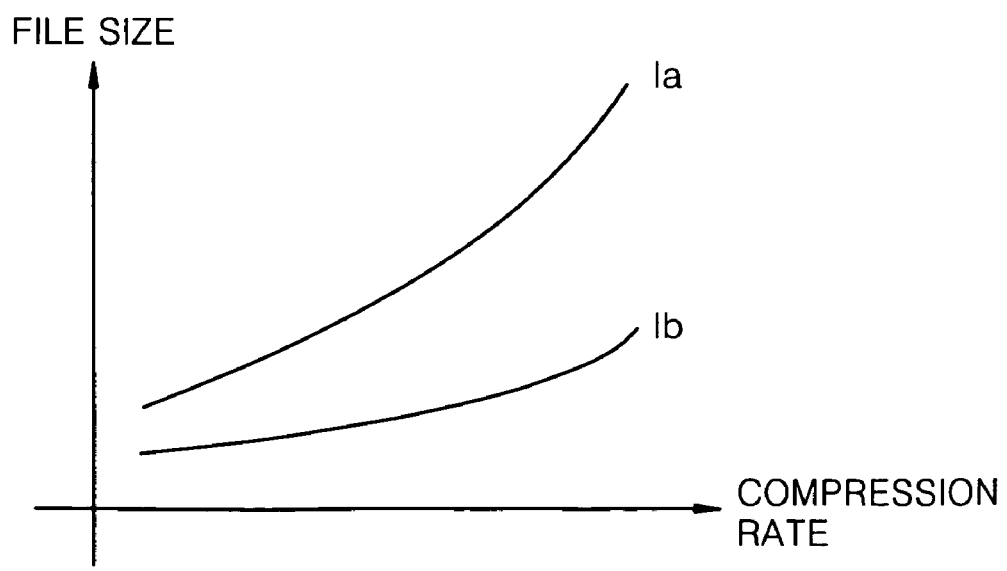

FIGS. 1 and 2 are graphs for describing a method of creating first and second correlations Ia and Ib, according to an embodiment of the present invention.

In the embodiments shown in FIGS. 1 and 2, two or more reference correlations between a compression rate and a file size are used. A correlation between a compression rate and a file size is generally not linear and may differ in accordance with a file type. Thus, it is sometimes difficult to predict a target compression rate by using just one reference correlation. Accordingly, the embodiments of the present invention shown in FIGS. 1 and 2 provide a method of relatively accurately and easily calculating a target compression rate by using a proportional correlation between a file size of a current file and a file size calculated from the two or more reference correlations, at the same compression rate.

The method of creating the first and second correlations Ia and Ib will now be described with reference to FIGS. 1 and 2. As described above, two or more reference correlations may be used.

In the embodiments shown in FIGS. 1 and 2, the first correlation Ia between a compression rate and a file size is formed in a table by using a first file. Then, the second correlation Ib between the compression rate and the file size is formed in a table by using a second file that is different from the first file. The smaller a variation of the compression rate, the more accurate a correlation is.

In the present embodiment, the values of the tables are marked on a coordinate plane having a horizontal axis representing the compression rate and a vertical axis representing the file size as shown in FIGS. 1 and 2. Referring to FIG. 1, the values of the tables are represented by groups of dots da and db. Referring to FIG. 2, the groups of dots da and db are respectively connected to each other so as to generate linear curves representing the first and second correlations Ia and Ib.

In an embodiment, the first and second files may be text files, audio files, video files, image files or files including other types of data. For example, in the present embodiment, if the first and second files are image files, the first file may include a complicated image in which the sum of gradation differences between neighboring pixels is large and the second file may include a simple image in which the sum is relatively smaller than that of the complicated image.

As shown in the embodiment of FIG. 2, the first correlation Ia that uses the first file including the complicated image has a larger file size than the second correlation Ib that uses the second file including the simple image, at the same compression rate. Also, the first correlation Ia has a larger variation of the file size than the second correlation Ib at the same variation of the compression rate. As such, various correlations between the compression rate and the file size may be created in accordance with the file type.

In particular, the sum of gradation differences between neighboring pixels included in an image file may influence the correlation and thus reference correlations may be created by using the first and second files having greatly different sums of gradation differences between neighboring pixels. For example, assuming that a value of a pixel included in an image is marked as (R, G, B) and is represented by using 256 gradations from 1 to 255, the first file may include an image in which neighboring pixels have gradation values such as (255, 0,0), (0,255,0), and (0,0,255) and the second file may include an image in which neighboring pixels have gradation values such as (1,0,0), (0,1,0), and (0,0,1).

In an embodiment, the first and second files may be selected, for example, by a user so as to be used to create the reference correlations. Alternatively, correlations between the compression rate and the file size of previous files may be automatically stored as a database and the first and second files may be created or updated by using the database. In another embodiment, correlations may be stored in memory or a cache without using a database. In yet another embodiment, two or more files may be automatically selected based on, for example, the data values in them or metadata.

Figure 3:
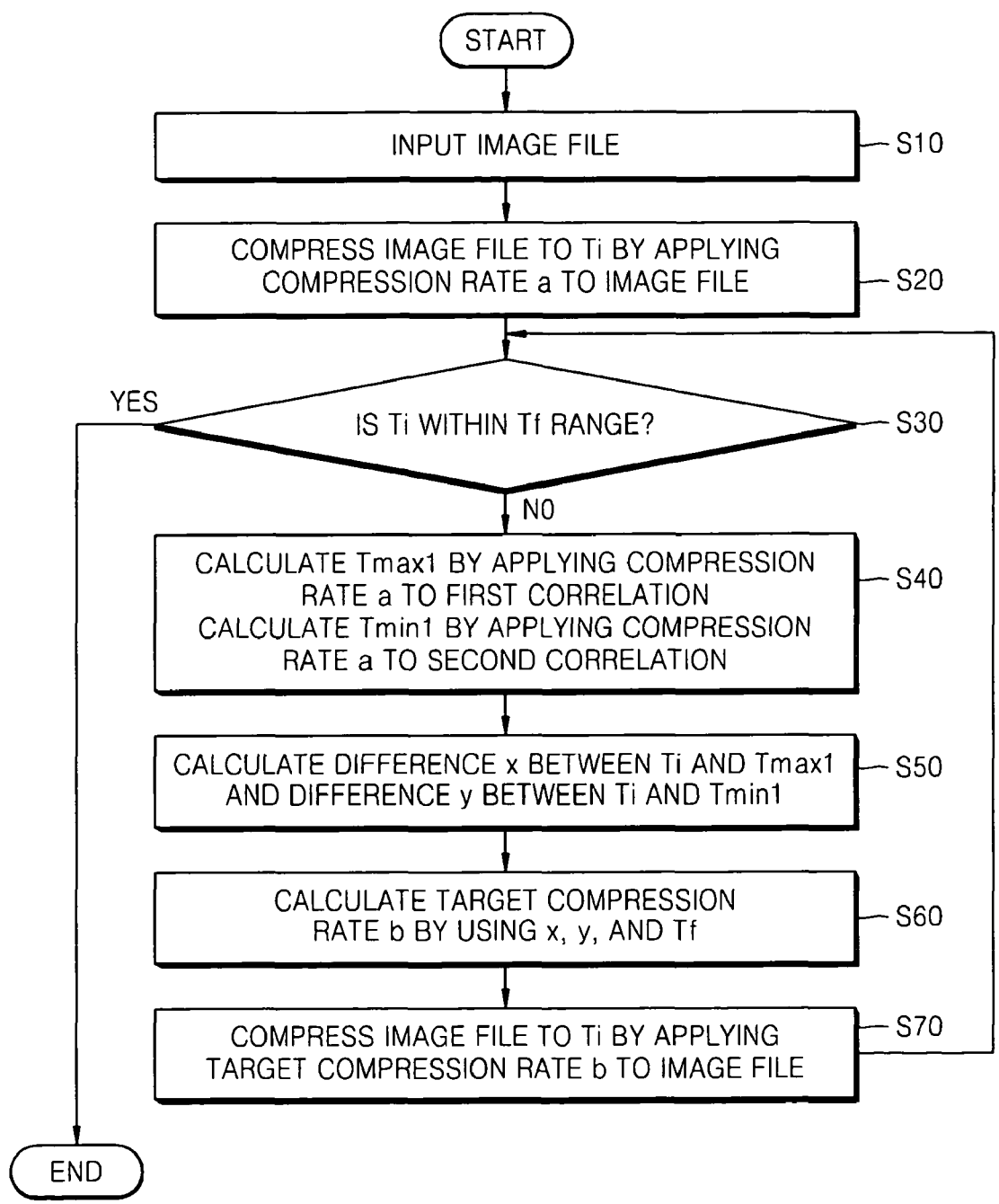
FIG. 3 is a flowchart of a method of controlling a compression rate of a file, according to an embodiment of the present invention.

FIG. 3 is a flowchart of a method of controlling a compression rate of a file, according to an embodiment of the present invention.

In the current embodiment, a method of encoding and compressing the file after reference correlations, such as first and second correlations which are described above with reference to FIGS. 1 and 2, are created will be described. In addition, in the present embodiment it is assumed that the file to be compressed is an image file and that files used to create the first and second correlations are also image files.

Referring to FIG. 3, initially, an image file is input in operation S10. Here, the image files used to create the first and second correlations are respectively referred to as first and second image files and the input image file is referred to as a third image file.

The third image file is firstly compressed to a file size Ti by applying a predetermined compression rate a to the third image file in operation S20.

Then, it is determined whether the file size Ti is within a predetermined range including a target file size Tf in operation S30. The third image file may not be easily compressed to the target file size Tf and thus the predetermined range is determined by applying ±α to the target file size Tf. Then, it is determined whether the file size Ti is within the predetermined range or is the same as the target file size Tf.

If the file size Ti is not in the predetermined range or is not the same as the target file size Tf, the predetermined compression rate a is applied to the first correlation so as to calculate a file size Tmax1 and is also applied to the second correlation so as to calculate a file size Tmin1 in operation S40.

A difference x between the file size Ti and the file size Tmax1 and a difference y between the file size Ti and the file size Tmin1 are calculated in operation S50. The differences x and y may be represented as ratios.

The differences x, y, and the target file size Tf are then used to calculate a target compression rate b in operation S60.

In more detail, the target compression rate b may be calculated as described below.

Using Equations 1 and 2 below, a file size Tmax2 and a file size Tmin2 may be respectively calculated. In this case, the file size Tmax2 represents a file size of the first image file when the target compression rate b is applied to the first correlation and the file size Tmin2 represents a file size of the second image file when the target compression rate b is applied to the second correlation.

$$x = \frac{|Tmax2 - Tf|}{Tmax2 - Tmin2} \quad (1)$$

$$y = \frac{|Tmin2 - Tf|}{Tmax2 - Tmin2} \quad (2)$$

Accordingly, the file size Tmax2 and the file size Tmin2 may be calculated by using Equations 1 and 2 and the target compression rate b may be calculated by respectively applying the file size Tmax2 and the file size Tmin2 to the first and second correlations.

The third image file is secondly compressed to the file size Ti by applying the target compression rate b to the third image file in operation S70. In operation S70, the third image file may be secondly compressed after the third image file is firstly compressed in operation S20. Accordingly, the file size Ti of operation S70 may have a smaller value than the file size Ti of operation S20.

It is re-determined whether the file size Ti after the third image file is secondly compressed is within the predetermined range or is the same as the target file size Tf in operation S30.

If the file size Ti is within the predetermined range or is the same as the target file size Tf, the method is terminated.

In the above-described method, a target compression rate of a desired file size may be accurately and easily calculated by using a predetermined algorithm.

Figure 4:
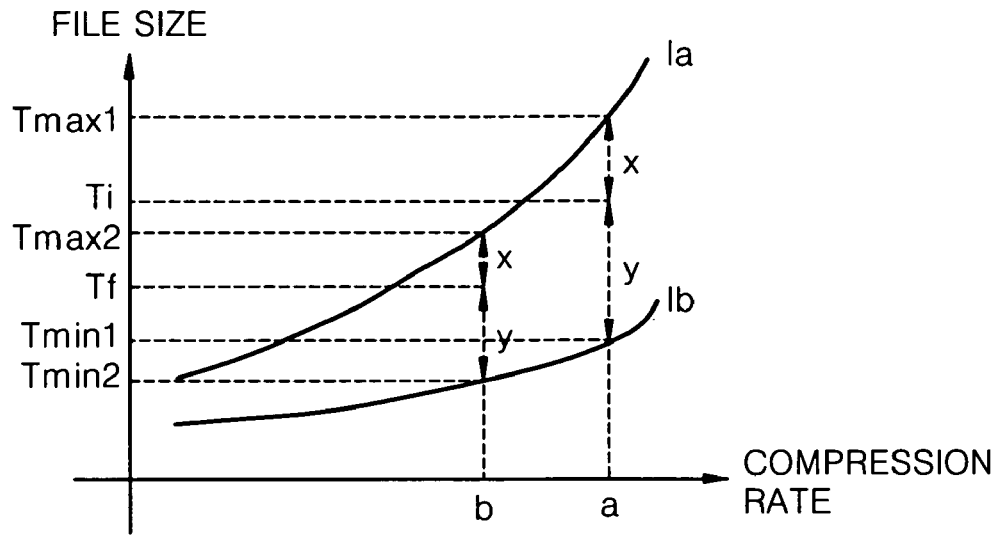
FIGS. 4 through 6 are linear graphs illustrating examples when the method illustrated in FIG. 3 is implemented, according to embodiments of the present invention.
Figure 5:
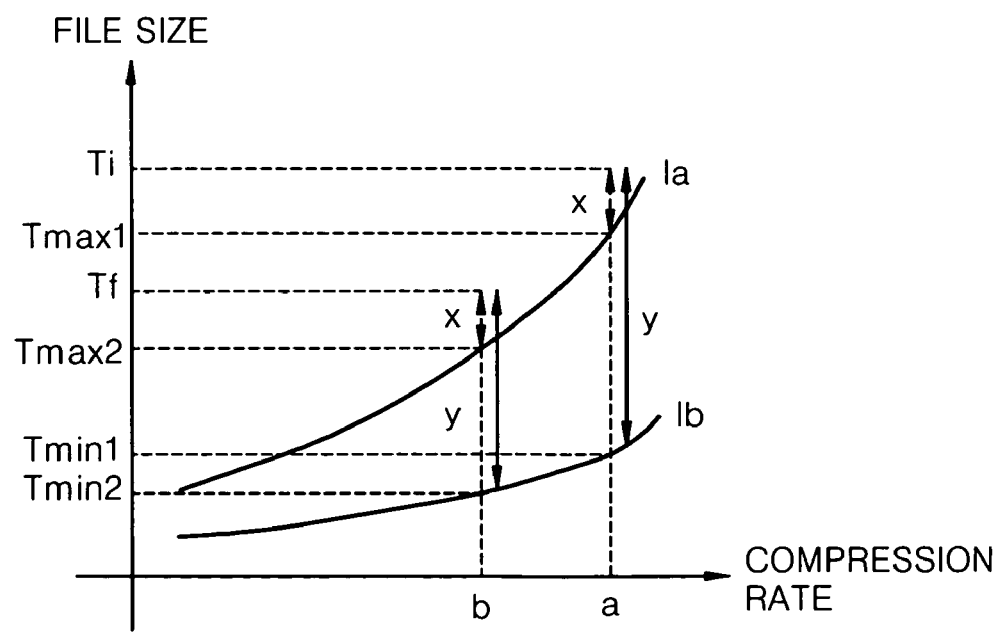
Figure 6:
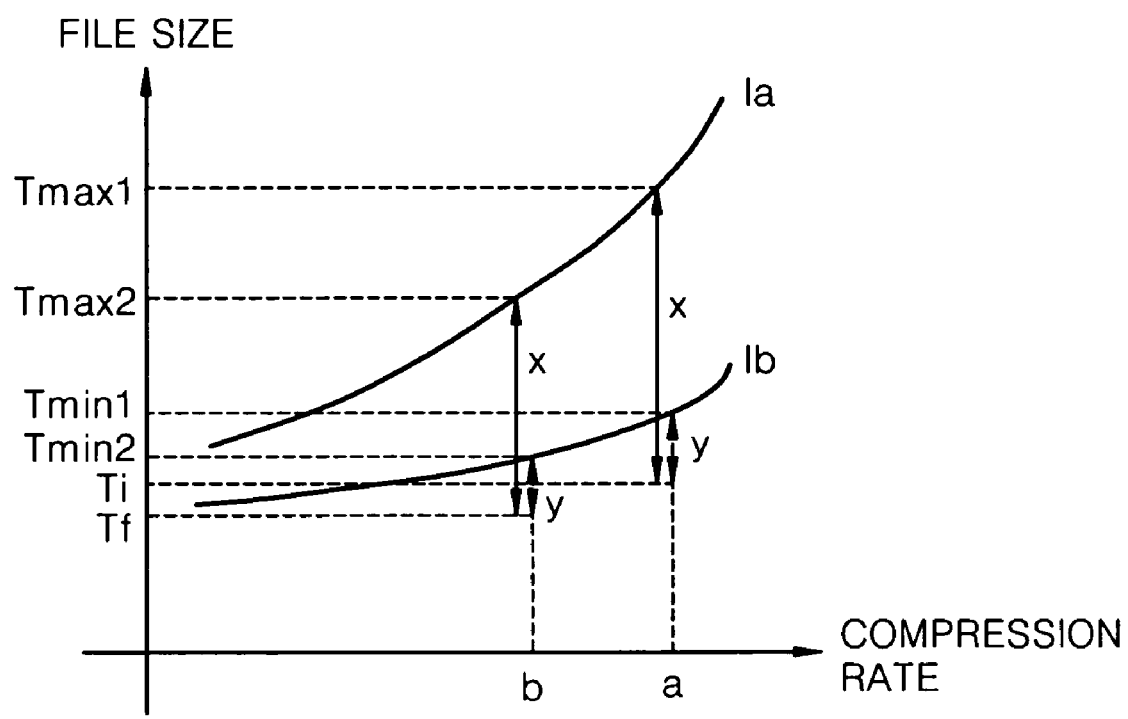

FIGS. 4 through 6 are linear graphs illustrating examples when the method illustrated in FIG. 3 is implemented, according to embodiments of the present invention. The method illustrated in FIG. 3 will be described in detail by referring to the graphs of FIGS. 4 through 6.

FIGS. 4 through 6 illustrate first and second correlations Ia and Ib on a coordinate plane having a horizontal axis representing a compression rate and a vertical axis representing a file size.

FIG. 4 illustrates a case when a file size of an image file is between a file size Tmax1 and a file size Tmin1 at the same compression rate. The first correlation Ia is a correlation between the compression rate and a file size of a first image file including a relatively complicated image. The second correlation Ib is a correlation between the compression rate and a file size of a second image file including a relatively simple image. In more detail, the sum of gradation differences between neighboring pixels of the complicated image included in the first image file is larger than that of the simple image included in the second image file.

Accordingly, it is clear in FIG. 4 that the first correlation Ia has a larger file size than the second correlation Ib at the same compression rate and has a larger variation in file size than the second correlation Ib at the same variation in compression rate.

As such, the compression rate is controlled in order to encode and compress a third image file by previously creating the first and second correlations Ia and Ib using the first and second image files.

The third image file is compressed to a file size Ti by applying a predetermined compression rate a to the third image file. The first image file is compressed to a file size Tmax1 by applying the predetermined compression rate a to the first correlation Ia, and the second image file is compressed to a file size Tmin1 by applying the predetermined compression rate a to the second correlation Ib.

A difference x between the file size Ti and the file size Tmax1 and a difference y between the file size Ti and the file size Tmin1 are calculated. The differences x and y may be calculated using Equations 3 and 4 below. The x refers to the difference Ti and Tmax1 and y refers to the difference Ti and Tmin1. The x and y may be represented as the absolute value of the differences respectively, and as ratio such as x/y, for example 2/3.

$$x = |Tmax1 - Ti| \quad (3)$$

$$y = |Tmin1 - Ti| \quad (4)$$

Then, a file size Tmax2 on the first correlation Ia which is separated from a target file size Tf as much as the difference x and a file size Tmin2 on the second correlation Ib which is separated from the target file size Tf as much as the difference y are calculated using Equations 1 and 2.

Thus, a target compression rate b corresponding to the file size Tmax2 on the first correlation Ia or the file size Tmin2 on the second correlation Ib may be calculated so as to be close to the target file size Tf. Also, the target compression rate b may be calculated more accurately and easily by using an algorithm instead of predicting the target compression rate b by using empirical rules.

FIG. 4 illustrates a case when the file size Ti that is calculated by applying the predetermined compression rate a to the third image file, is between the file size Tmax1 and the file size Tmin1 at the same predetermined compression rate a. However, FIG. 5 illustrates a case when the file size Ti is greater than the file size Tmax1 on the coordinate plane.

In FIG. 5, the target compression rate b may be calculated using the method described above with reference to FIG. 4.

According to the current embodiment, the third image file having the file size Ti that is larger than the file size Tmax1 corresponding to the first correlation Ia may be calculated by compressing the third image file by using the predetermined compression rate a. The difference x from the file size Ti to the file size Tmax1 that corresponds to the predetermined compression rate a on the first correlation Ia and the difference y from the file size Ti to the file size Tmin1 that corresponds to the predetermined compression rate a on the second correlation Ib are calculated. The x refers to the difference Ti and Tmax1 and y refers to the difference Ti and Tmin1. The x and y may be represented as the absolute value of the differences respectively, and as ratio such as x/y, for example 2/3.

The target compression rate b that allows the third image file to have the target file size Tf, may be calculated by using the differences x and y and the target file size Tf. In more detail, the file size Tmax2 that is separated from the target file size Tf as much as the difference x and the file size Tmin2 that is separated from the target file size Tf as much as the difference y are calculated using Equations 1 and 2. Then, the target compression rate b can be calculated by respectively applying the file size Tmax2 and the file size Tmin2 to the first and second correlations Ia and Ib.

The third image file may be calculated more accurately and easily so as to have the target file size Tf by applying the target compression rate b to the third image file.

FIG. 6 illustrates a case when the file size Ti that is calculated by applying the predetermined compression rate a to the third image file, is less than the file size Tmin1 on the coordinate plane.

In FIG. 6, the target compression rate b may be calculated using the method described above with reference to FIG. 4.

The difference x from the file size Ti to the file size Tmax1 that is calculated by applying the predetermined compression rate a to the first correlation Ia and the difference y from the file size Ti to the file size Tmin1 that is calculated by applying the predetermined compression rate a to the second correlation Ib are calculated. The differences x and y may be represented as ratios. Then, the file size Tmax2 and the file size Tmin2 which respectively correspond to the differences x and y from the target file size Tf are calculated. The target compression rate b may be calculated using the file size Tmax2 and the file size Tmin2.

Figure 7:
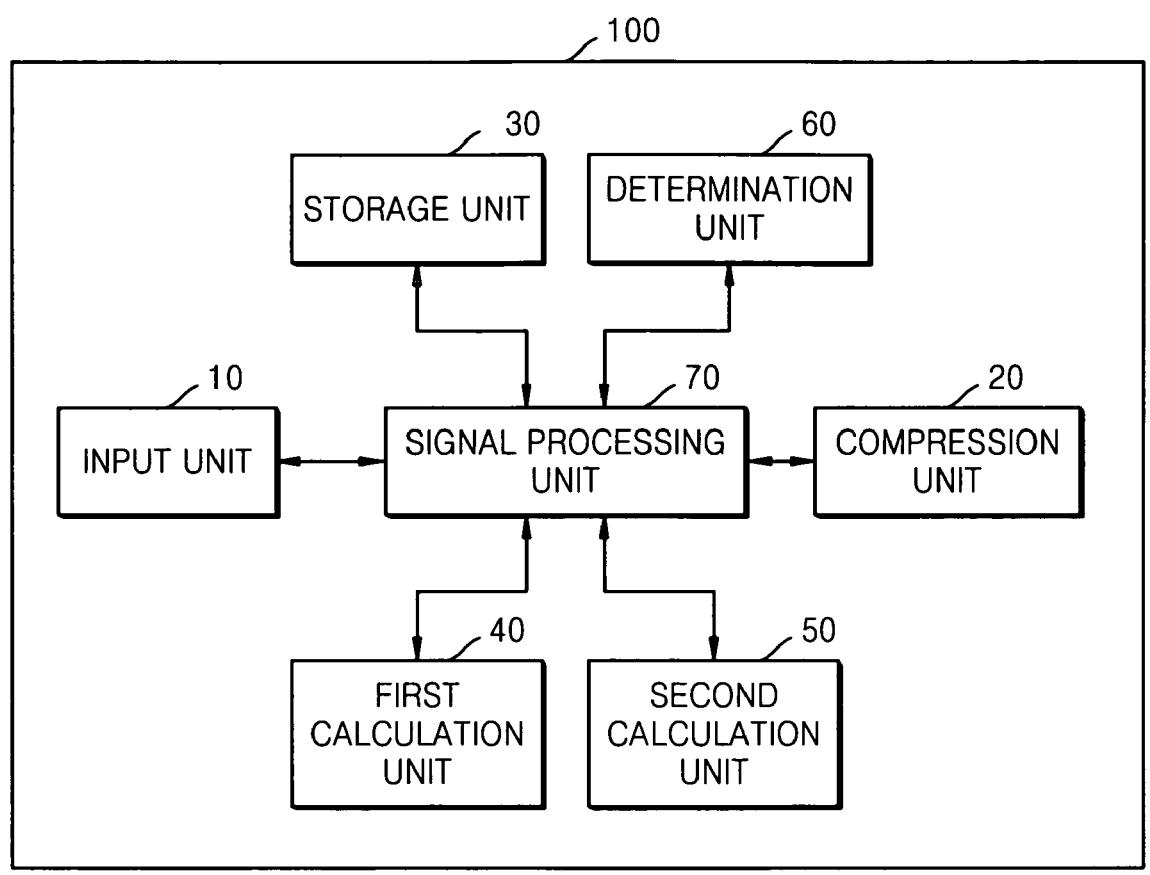
FIG. 7 is a block diagram of an apparatus for controlling a compression rate of a file, according to an embodiment of the present invention.

FIG. 7 is a block diagram of an apparatus 100 for controlling a compression rate of a file, according to an embodiment of the present invention.

Referring to FIG. 7, the apparatus 100 according to the current embodiment of the present invention includes an input unit 10 and a compression unit 20.

The apparatus 100 also includes a storage unit 30 storing a database representing a correlation between a compression rate and a file size of each of two or more files. For example, the storage unit 30 may store a database on a first correlation between the compression rate and the file size of a first file and a second correlation between the compression rate and the file size of a second file in a form of graphs on a coordinate plane.

The apparatus 100 also includes a first calculation unit 40 for calculating differences x and y from a file size of a third image file compressed by the compression unit 20 using a predetermined compression rate a to file sizes calculated by applying the predetermined compression rate a to the first and second correlations, respectively. In this case, the differences x and y may be represented as ratios. In more detail, the algorithm for calculating the differences x and y by using Equations 1 and 2 which is described with reference to FIG. 3 may be included in the first calculation unit 40.

The apparatus 100 also includes a second calculation unit 50 for calculating a target compression rate b by using the differences x and y and a target file size Tf. In more detail, the target compression rate b may be calculated by including the algorithm using Equations 3 and 4 which is described with reference to FIG. 4, in the second calculation unit 50.

The apparatus 100 also includes a determination unit 60 for determining whether the file size of the third image file compressed by the compression unit 20 is the same as the target file size Tf or is within a target file size Tf range.

The apparatus 100 further includes a signal processing unit 70 for processing control signals so as to control each unit to perform properly.

As described above, according to an embodiment of the present invention, a compression rate that is close to a target file size may be calculated more accurately by using a predetermined algorithm instead of predicting the compression rate by using empirical rules. Also, a target compression rate may be relatively simply and easily calculated.

Embodiments of the present invention can be used to determine the compression rates for various types of files and are not limited to certain types of files. In an embodiment of the present invention, the number of files used to determine the compression rate may be more or less than two. In an embodiment of the present invention, the correlation data may be pre-calculated and stored in the memory of an apparatus. In another embodiment, the correlation data may be determined when a target file is to be compressed. An embodiment of the present invention may be included as part of a digital photographing apparatus such as a digital camera, a digital camcorder, or a camera phone, or a personal computer, a disk drive or any device including or processing digital data.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of determining a target compression rate for a file, the method comprising using a processor to perform at least the steps of:
    determining a plurality of sizes of a first file correlating to a plurality of compression rates, including a first size of the first file correlating to an initial compression rate;
    determining a plurality of sizes of a second file correlating to the plurality of compression rates, including a first size of the second file correlating to the initial compression rate;
    compressing a third file using the initial compression rate and determining an initial size of the compressed third file; and
    calculating a target compression rate based on the difference x between the first size of the first file and the initial size of the third file, the difference y between the first size of the second file and the initial size of the third file, and a target file size Tf for the third file.

2. The method of claim 1, wherein calculating the target compression rate comprises:
    based on the difference x, the difference y and the target file size Tf, calculating a second file size Tmax2 for the first file and a second file size Tmin2 for the second file; and
    determining the target compression rate, which correlates to Tmax2 and Tmin2.

3. The method of claim 2, wherein Tmax2 and Tmin2 are calculated using equations 1 and 2 below:

$$x = \frac{|T\max 2 - Tf|}{T\max 2 - T\min 2} \quad (1)$$

$$y = \frac{|T\min 2 - Tf|}{T\max 2 - T\min 2}. \quad (2)$$

4. The method of claim 1, wherein the first size of the first file is larger than the first size of the second file.

5. The method of claim 1, further comprising:
    determining a second size of the first file correlating to the target compression rate; and
    determining a second size of the second file correlating to the target compression rate,
    wherein the difference between the first and second sizes of the first file is greater than the difference between the first and second sizes of the second file.

6. The method of claim 1, wherein the first, second, and third files are image files.

7. The method of claim 6, wherein the first file has a larger sum of gradation differences between neighboring pixels than the second file.

8. The method of claim 1, further comprising:
creating one of a graph and a table showing the correlations between the plurality of compression rates and the plurality of sizes of the first and second files.

9. The method of claim 1, further comprising:
determining whether the initial size of the third file is within a range of values including the target file size Tf, wherein the target compression rate is calculated if the initial size of the third file is not within the range of values including the target file size Tf.

10. The method of claim 1, further comprising:
selecting the first file and the second file based on a type of data in the third file.

11. An apparatus for determining a target compression rate for a file, the apparatus comprising:
a storage unit for storing a first correlation between an initial compression rate and a size of a first file compressed at the initial compression rate, and a second correlation between the initial compression rate and a size of a second file compressed at the initial compression rate;
an input unit for inputting a third file;
a compression unit for compressing the third file using the initial compression rate;
a first calculation unit for calculating the difference x between the size of the compressed first file and a size of the compressed third file and the difference y between the size of the compressed second file and the size of the compressed third file; and
a second calculation unit for calculating a target compression rate using a target file size for the third file and the differences x and y.

12. The apparatus of claim 11, further comprising:
a determination unit for determining whether the size of the compressed third file is within a target file size range, wherein the target compression rate is calculated if the size of the compressed third file is not within the target file size range.

13. The apparatus of claim 11, wherein the second calculation unit calculates the target compression rate by calculating a second file size Tmax2 for the first file and a second file size Tmin2 for the second file based on the difference x, the difference y and the target file size, and determining the target compression rate which correlates to Tmax2 and Tmin2.

14. A method for compressing a file comprising using a processor to perform at least the steps of:
compressing a target file at an initial compression rate and determining a size of the compressed target file;
comparing the size of the target file compressed at the initial compression rate to sizes of a first file and a second file compressed at the initial compression rate;
based on the comparisons and a target size for the target file, calculating a target compression rate; and
compressing the target file using the target compression rate.

15. The method of claim 14 further comprising:
selecting the initial compression rate, the first file and the second file based on a type of data in the target file.

16. The method of claim 14, wherein the first, second and target files are image files.

17. The method of claim 16, wherein the first file has a larger sum of gradation differences between neighboring pixels than the second file.

18. The method of claim 14, wherein calculating the target compression rate comprises:
calculating a second file size Tmax2 for the first file and a second file size Tmin2 for the second file based on the target file size and the differences between the size of the target file compressed at the initial compression rate and each of the sizes of the first and second files compressed at the initial compression rate; and
determining the target compression rate which correlates to Tmax2 and Tmin2.

19. The method of claim 14, wherein the sizes of the first and second files compressed at the initial and target compression rates are stored in a memory.

20. The method of claim 14, wherein the target file is compressed using the target compression rate if the size of the target file compressed using the initial compression rate is not within a target file size range.

* * * * *